United States Patent [19]
Crewson et al.

[11] Patent Number: 6,063,267
[45] Date of Patent: May 16, 2000

[54] APPARATUS FOR TREATING FLOWING LIQUID WITH ELECTROMAGNETIC FLUX

[75] Inventors: Walter F. J. Crewson, Ridgefield, Conn.; Joseph G. Munisteri, Houston, Tex.; Italo Ricci, Tuscania, Italy

[73] Assignee: Clearwater Systems, LLC, Essex, Conn.

[21] Appl. No.: 09/116,796

[22] Filed: Jul. 16, 1998

[51] Int. Cl.[7] .............................. C02F 1/48; B01D 17/12
[52] U.S. Cl. ..................... 210/143; 210/222; 210/243; 204/554; 204/555
[58] Field of Search ................. 210/85, 94, 143, 210/138; 223/122, 243, 695, 748; 204/554, 555, 660, 661, 663, DIG. 5; 422/186.01, 186.02, 186.03

[56] References Cited

U.S. PATENT DOCUMENTS

| | | | |
|---|---|---|---|
| 4,938,875 | 7/1990 | Niessen | 210/695 |
| 5,074,998 | 12/1991 | DeBaat Doelman | 210/97 |
| 5,106,491 | 4/1992 | Schulze et al. | 210/222 |
| 5,171,431 | 12/1992 | Shulte | 210/94 |
| 5,480,557 | 1/1996 | Kawasaki et al. | 210/695 |
| 5,670,041 | 9/1997 | Cho et al. | 210/222 |
| 5,702,600 | 12/1997 | Pandolfo | 210/222 |
| 5,725,778 | 3/1998 | Cho et al. | 210/695 |
| 5,738,766 | 4/1998 | Jefferson | 204/155 |

FOREIGN PATENT DOCUMENTS 0 323 435  7/1989  European Pat. Off. .

OTHER PUBLICATIONS

Translation of abstract of above–identified European Patent Application No. 0 323 435.

*Primary Examiner*—Joseph W. Drodge
*Attorney, Agent, or Firm*—McCormick, Paulding & Huber LLP

[57] ABSTRACT

In an apparatus for treating liquid with electromagnetic flux, one or more coils surrounding a liquid conducting pipe are excited by a switching circuit including a triode switch turned on and off in response to the voltage applied to the coil or coils in such a way that during each operative half cycle of the supply voltage a current is conducted through the coils during an initial portion of the half cycle and then at a substantial time before the end of the half cycle, the switch is turned to an open condition causing the current built up in the coils to be taken up by a series resonant circuit, formed by the inductance of the coil or coils an associated given capacitance and the power supply, to produce a ringing current in and a ringing voltage across each coil and consequent ringing electromagnetic flux in the liquid passing through the pipe. The apparatus may have either a half wave or full wave mode of operation. When two or more coils are used, preferably the fluxes produced by at least two of the coils move in opposite directions through the liquid.

22 Claims, 7 Drawing Sheets

| Nominal Pipe Size | Coils L₁ & L₃ | Coils L₂-Inner & L₂-Outer | Tuning Capacitor C_T | Nominal Power Supply Voltage (under load) |
|---|---|---|---|---|
| 3/4" | turns 375<br>wire 20 ga.<br>length 1.9" | turns 250<br>wire 20 ga.<br>length 1.9" | 0.039µf | 11.0V(rms) |
| 1" | turns 375<br>wire 18 ga.<br>length 2.3" | turns 250<br>wire 18 ga.<br>length 2.3" | 0.010µf | 13.0V(rms) |
| 2" | turns 375<br>wire 17 ga.<br>length 3.7" | turns 250<br>wire 17 ga.<br>length 3.7" | 0 | 19.0V(rms) |
| 4" | turns 375<br>wire 16 ga.<br>length 3.55" | turns 250<br>wire 16 ga.<br>length 3.55" | 0 | 33.0V(rms) |
| 6" | turns 375<br>wire 12 ga.<br>length 5.18" | turns 250<br>wire 12 ga.<br>length 5.18" | 0 | 37.0V(rms) |
| 8" | turns 146<br>wire 8 ga.<br>length 8.5" | turns 146<br>wire 8 ga.<br>length 8.5" | 0 | 37.0V(rms) |

FIG. 10

APPARATUS FOR TREATING FLOWING LIQUID WITH ELECTROMAGNETIC FLUX

FIELD OF THE INVENTION

This invention concerns an apparatus for treating flowing water or other liquids, such as metal working fluids, crude oil, petroleum derivatives, and any liquids containing microorganisms and/or dissolved solids with electromagnetic flux for the purpose of conditioning the liquid to reduce or eliminate its tendency to deposit scale onto the surfaces of pipes, equipment, appliances and other apparatus to which it subsequently becomes exposed, to reduce or eliminate microorganisms which may be included in the liquid and/or for other purposes; and deals more particularly with such an apparatus including at least one electrical coil surrounding a pipe through which the liquid flows with the coil being intended to be powered by an alternating current source and being connected in circuit with other circuit components such that during successive portions of its operating time the coil and a given capacitance become part of a series resonant circuit having a high resonant frequency, many times greater than the frequency of the power source, so that the frequency of the electromagnetic flux passing through the center of the coil, and, therefore, through the liquid flowing through the pipe, is of an equally high frequency.

BACKGROUND OF THE INVENTION

In the past, various different devices and methods have been proposed for treating liquid with electromagnetic flux for the purpose of reducing the scaling propensity of the liquid, for reducing the number of living microorganisms contained in the liquid or for other purposes. Some of these devices have used either stationary or movable permanent magnets for producing a magnetic flux, and others have used electrical coils arranged in various different ways with respect to pipes conducting the liquid, with the coils being energized by either a direct current power source or an alternating current power source to create an electromagnetic flux used as the liquid treatment factor. In the case of devices using electromagnetic flux, it is known from U.S. Pat. No. 5,702,600 to provide an apparatus including a plurality of electrical coils surrounding different separate longitudinal sections of a liquid conducting pipe, with two of the coils being wound on top of one another, a diode being so connected in circuit with the coils and with the power source that current from the power source is conducted through the coils only during alternate half cycles of one voltage polarity, with some current of a ringing nature apparently flowing through each coil following the end of each half cycle of diode conduction. However, the ringing current, and the electromagnetic flux produced appears to be weak and of very short duration so as to be of small effectiveness.

The object of the invention is, therefore, to provide an apparatus for treating flowing liquid with electromagnetic flux whereby the flux generated and passed through the flowing liquid includes successive periods of ringing flux with the flux oscillations during the ringing periods being of greater amplitude, with the periods themselves being of longer duration, and with the periods possibly occurring more frequently than in prior apparatuses so as to have a greater effect on the treated liquid than has heretofore been the case.

SUMMARY OF THE INVENTION

The invention resides in an apparatus for treating flowing liquid with electromagnetic flux wherein successive periods of ringing flux are produced by a circuit including one or more electrical coils surrounding a pipe through which the liquid flows with the coil or coils being connected to a source of alternating current power and to a given capacitance and a triode switching circuit in such a way that during at least every half cycle of the power source of the same polarity current is applied to the coil or coils and through the triode switch during an initial portion of each such half cycle due to power derived from the power source and so that a substantial time in advance of the completion of the half cycle the triode switch is opened to produce a ringing current in the coil or coils, and a consequent ringing electromagnetic flux in the liquid, due to the coil or coils then becoming part of a series resonant circuit including a given capacitance which may totally or in part be provided by a winding capacitance of the coils or by a separate tuning capacitor.

The invention also resides in the apparatus including a number of coils surrounding the pipe with the coils being so connected with one another and to other components of the apparatus that when currents flow through the coils the flux generated by at least one of the coils and passing through the liquid has a direction opposite to the direction of the flux produced by another one of the coils and passing through the liquid.

The invention also resides in other details of the construction of the apparatus as set out in the appended claims, and these details will be apparent from the following detailed description of preferred embodiments of the invention, from the accompanying drawings and from the claims themselves.

BRIEF DESCRIPTION OF THE DRAWINGS

The invention is described hereinafter by way of exemplary and preferred embodiments of the invention illustrated by the accompanying drawings. These drawings are.

DETAILED DESCRIPTION OF THE PREFERRED EMBODIMENTS

Figure 1:
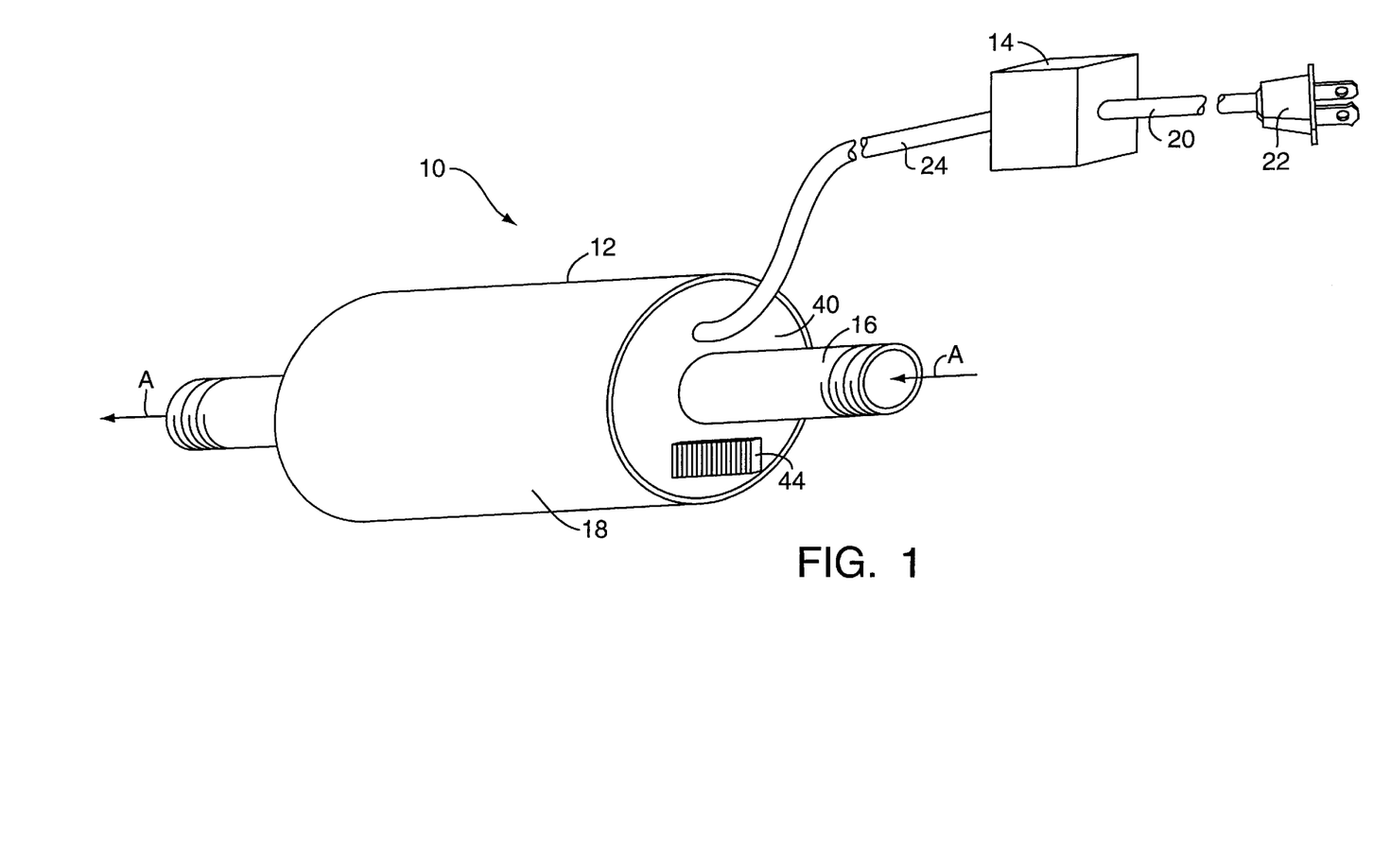
FIG. 1 A perspective view of an apparatus embodying the invention.

Turning first to FIG. 1, an apparatus embodying the invention is indicated generally at 10 and comprises basically a pipe unit 12 and an alternating current electrical power supply 14. The pipe unit 12 includes a pipe 16 through which liquid to be treated passes with the direction of flow of liquid being indicated by the arrows A. The pipe 16 may be made of various materials, but as the treatment of the liquid effected by the pipe unit 12 involves the passage of electromagnetic flux through the walls of the pipe and into the liquid passing through the pipe, the pipe is preferably made of a non-electrical conducting material to avoid diminution of the amount of flux reaching the liquid due to some of the flux being consumed in setting up eddy currents in the pipe material. Other parts of the pipe unit 12 are contained in or mounted on a generally cylindrical housing 18 surrounding the pipe 16.

The pipe unit 12 is preferably, and as hereinafter described, one designed for operation by a relatively low voltage power source, for example, a power source having a voltage of 11 V(rms) to 37 V(rms) and a frequency of 60 Hz and, therefore, the illustrated power supply 14 is a voltage step down transformer having a primary side connected to an input cord 20 adapted by a plug 22 for connection to a standard mains, such as one supplying electric power at 120 V 60 Hz or 240 V 60 Hz, and having an output cord 24 connected to the secondary side of the transformer and supplying the lower voltage power to the pipe unit 12. The pipe unit 12 may be designed for use with pipes 16 of different diameter and the particular output voltage provided by the power source 14 is one selected to best suit the diameter of the pipe and the size and design of the related components of the pipe unit.

Figure 2:
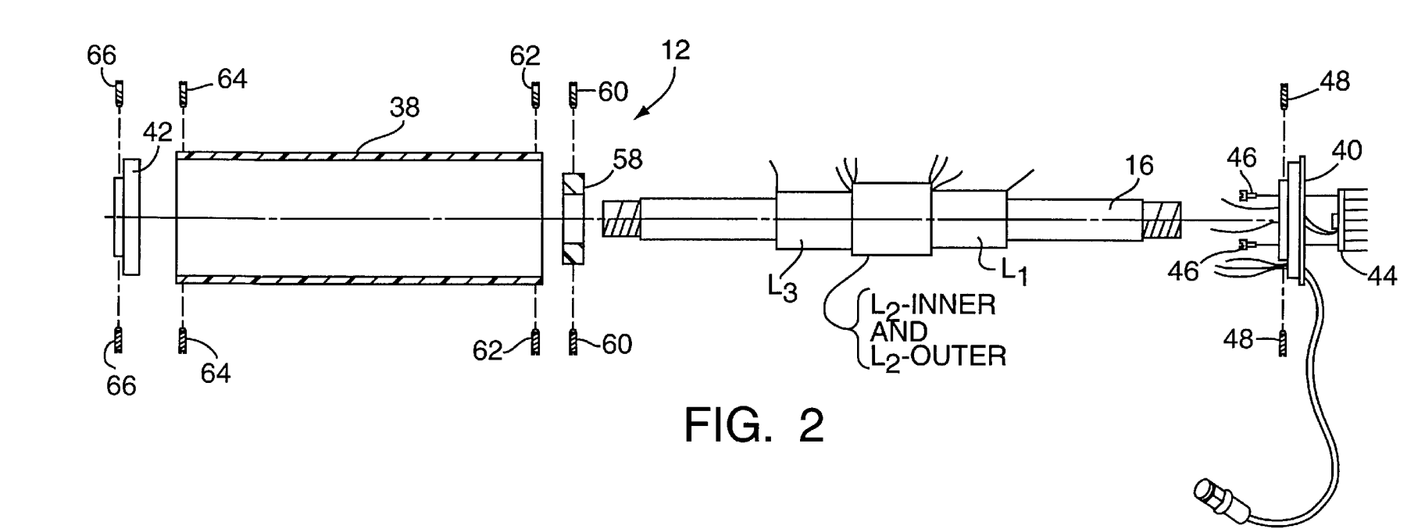
FIG. 2 An exploded view of the pipe unit of the apparatus of FIG. 2.
Figure 3:
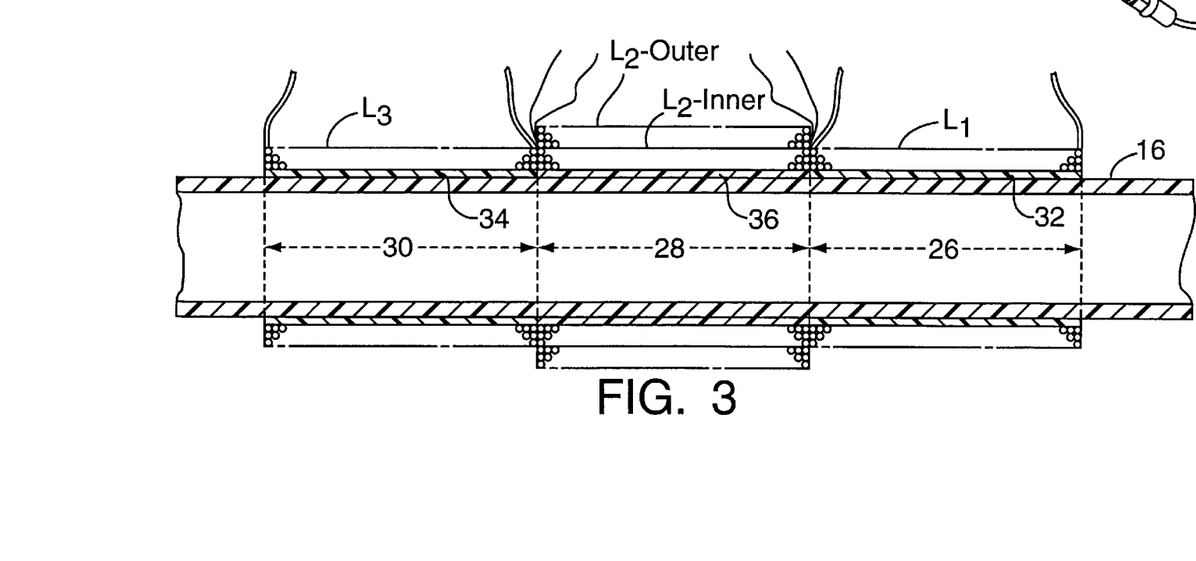
FIG. 3 A longitudinal cross sectional view taken through the pipe unit of FIG. 1.

The pipe unit 12, in addition to the housing 18 and pipe 16, consists essentially of an electrical coil means surrounding the pipe and a switching circuit for controlling the flow of current through the coil means in such a way as to produce successive periods of ringing current through the coil means and resultant successive ringing periods of electromagnetic flux passing through the liquid in the pipe 16. The number, design and arrangement of the coils making up the coil means may vary, and by way of example in FIGS. 2 and 3 the coil means is shown to consist of four coils, $L_1$, $L_2$-outer, $L_2$-inner and $L_3$ arranged in a fashion similar to that of U.S. Pat. No. 5,702,600. The coils, as shown in FIGS. 2 and 3, are associated with three different longitudinal sections 26, 28 and 30 of the pipe 16. That is, the coil $L_1$ is wound onto and along a bobbin 32 in turn extending along the pipe section 26, the coil $L_3$ is wound on and along a bobbin 34 itself extending along the pipe section 30, and the two coils $L_2$-inner and $L_2$-outer are wound on a bobbin 36 itself extending along the pipe section 28, with the coil $L_2$-outer being wound on top of the coil $L_2$-inner. The winding of the two coils $L_2$-inner and $L_2$-outer on top of one another, or otherwise in close association with one another, produces a winding capacitance between those two coils which forms all or part of the capacitance of a series resonant circuit as hereinafter described.

Referring to FIG. 2, the housing 18 of the pipe unit 12 is made up of a cylindrical shell 38 and two annular end pieces 40 and 42. The components making up the switching circuit are carried by the end piece 40 with at least some of them being mounted on a heat sink 44 fastened to the end piece 40 by screws 46. In the assembly of the pipe unit 12, the end piece 40 is first slid onto the pipe 16, from the right end of the pipe as seen in FIG. 2, to a position spaced some distance from the right end of the pipe, and is then fastened to the pipe by set screws 48. The three coil bobbins 32, 36 and 34, with their coils, are then moved in succession onto the pipe 16 from the left end of the pipe until they abut one another and the end piece 40, with adhesive applied between the bobbins and the pipe to adhesively bond the bobbins to the pipe. An annular collar 50 is then slid onto the pipe from the left end of the pipe into abutting relationship with the coil $L_3$ and is fastened to the pipe by set screws 60, 60. The shell 38 is then slid over the pipe and fastened at its right end to the end piece 40 by screws 62, 62. Finally, the end piece 42 is slid over the pipe 16, from the left end of the pipe, and then fastened to the shell 38 by screws 64 and to the pipe by set screws 66.

Figure 4:
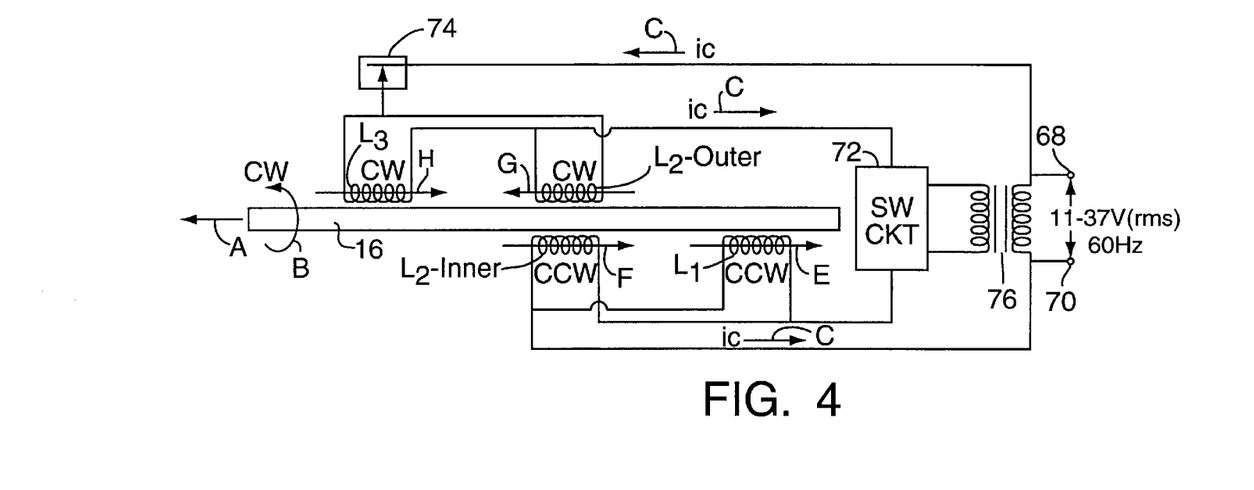
FIG. 4 A simplified schematic circuit diagram of the pipe unit of FIG. 1.

The basic wiring diagram for the pipe unit 12 is shown in FIG. 4. The input terminals connected to the power source 14 are indicated at 68 and 70. A connecting means including the illustrated conductors connects these input terminals 68 and 70 to the coils and to the switching circuit 72 in the manner shown with the connecting means including a thermal overload switch 74. The arrow B indicates the clockwise direction of coil winding, and in keeping with this reference the coil $L_3$ and the coil $L_2$-outer are wound around the pipe 16 in the clockwise direction and the coils $L_1$ and $L_2$-inner are wound around the pipe in the counterclockwise direction. Taking these winding directions and the illustrated electrical connections into account, it will be understood that when a current $i_c$ flows through the coils in the direction indicated by the arrows C, the directions of the magnetic fluxes passing through the centers of each of the coils, and therefore through the liquid in the pipe, are as shown by the arrows E, F, G and H in FIG. 4. That is, the fluxes passing through the centers of the coils $L_1$, $L_2$-inner and $L_3$ move in one direction longitudinally of the pipe and the flux passing through the center of the coil $L_2$-outer moves in the opposite direction. Depending on the design of the switching circuit 72, it may be necessary or desirable to provide a local ground for the switch circuit 72 and when this is the case, the switching circuit may be connected with the input terminals 68 and 70 through an isolation transformer 76, as shown in FIG. 4.

Figure 5:
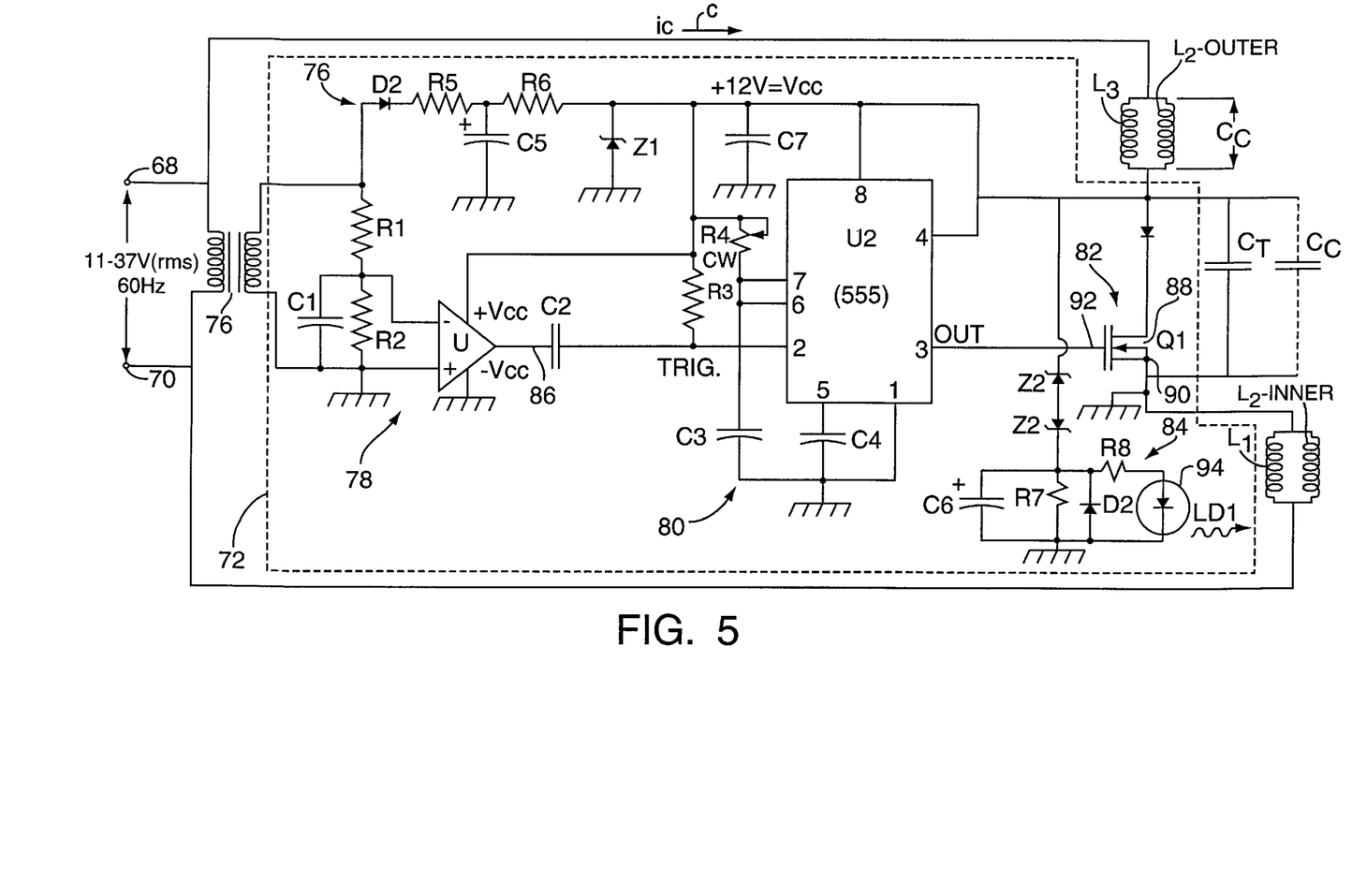
FIG. 5 A detailed schematic diagram of the electrical circuit of the pipe unit of FIG. 1.

FIG. 5 is a wiring diagram showing in greater detail the connecting means and switching circuit 72 of FIG. 4. Referring to FIG. 5, the switching circuit 72 includes a 12 V power supply subcircuit 76, a comparator subcircuit 78, a timer subcircuit 80, a switch 82 and an indicator subcircuit 84.

The components D2, R5, C5, R6 and Z1 comprise the 12 V DC power supply subcircuit 76 which powers the other components of the trigger circuit. Resistors R1 and R2 and the operational amplifier U1 form the comparator subcircuit 78. The resistors R1 and R2 form a voltage divider that sends a signal proportional to the applied AC voltage to the operational amplifier U1. The capacitor C1 serves to filter out any "noise" voltage that might be present in the AC input voltage to prevent the amplifier U1 from dithering. The amplifier U1 is connected to produce a "low" (zero) output voltage on the line 86 whenever the applied AC voltage is positive and to produce a "high" (+12 V) output when the AC voltage is negative.

When the AC supply voltage crosses zero and starts to become positive, the amplifier U1 switches to a low output. This triggers the 555 timer chip U2 to produce a high output on its pin 3. The capacitor C2 and R3 act as a high-pass filter to make the trigger pulse momentary rather than steady. The voltage at pin 2 of U2 is held low for about one-half millisecond. This momentary low trigger voltage causes U2 to hold a sustained high (+12 V) on pin 3.

The switch 82 may take various different forms and may be a sub-circuit consisting of a number of individual components, and in all events it is a three-terminal or triode switch having first, second and third terminals 88, 90 and 92, respectively, with the third terminal 92 being a gate terminal and with the switch being such that by the application of electrical signals to the gate terminal 92 the switch can be switched between an ON condition at which the first and second terminals are closed relative to one another and an OFF condition at which the first and second terminals are open relative to one another. In the preferred and illustrated case of FIG. 5, the switch 82 is a single MOSFET (Q1). The MOSFET (Q1) conducts, that is sets the terminals 88 and 90 to a closed condition relative to one another, as soon as the voltage applied to the gate terminal 92 becomes positive as a result of the input AC voltage appearing across the input terminals 68 and 70 becoming positive. This in turn allows current to build up in the coils $L_1$, $L_2$-inner, $L_2$-outer, and $L_3$. When the time constant formed by the product of the resistor R4 and the capacitor C3 has elapsed, the 555 chip U2 reverts to a low output at pin 3 turning the MOSFET (Q1) to its OFF condition. When this turning off of (Q1) occurs, any current still flowing in the coils is diverted to the capacitance which appears across the terminals 88 and 90 of (Q1). As shown in FIG. 5, this capacitance is made up of the wiring capacitance $C_c$ arising principally from the close association of the two coils $L_2$-inner and $L_2$-outer. This winding capacitance may of itself be sufficient for the purpose of creating a useful series resonant circuit with the coils, but if additional capacitance is needed, it can be supplied by a separate further tuning capacitor ($C_t$).

When the switch (Q1) turns to the OFF or open condition, any current still flowing in the coils is diverted to the capacitance ($C_c$ and/or $C_t$) and this capacitance in conjunction with the coils and with the power source form a series resonant circuit causing the current through the coils to take on a ringing wave form and to thereby produce a ringing electromagnetic flux through the liquid in the pipe 16. By adjusting the variable resistor R4, the timing of the opening of the switch (Q1) can be adjusted to occur earlier or later in each operative half cycle of the AC input voltage. Preferably, the circuit is adjusted by starting with R4 at its maximum value of resistance and then slowly adjusting it toward lower resistance until the LED indicator 94 of the indicator subcircuit 84 illuminates. This occurs when the peak voltage developed across the capacitance ($C_c$ and/or $C_t$) exceeds 150 V at which voltage the two Zener diodes Z2 can conduct. The Zener diodes charge capacitor 62 and the resulting voltage turns on the LED 94. When this indicator LED lights, the adjustment of the resistor R4 is then turned in the opposite direction until the LED just extinguishes, and this accordingly sets the switch (Q1) to generate a 150 V ringing signal.

Figure 6:
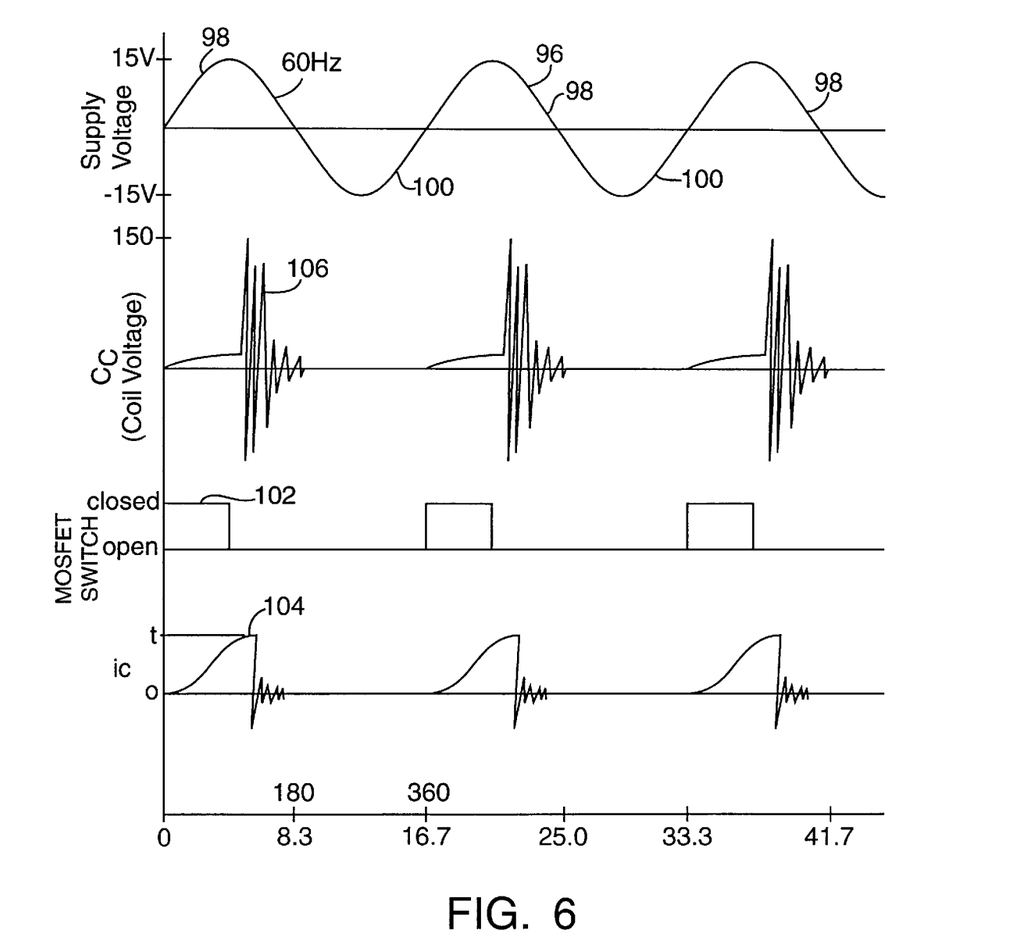
FIG. 6 A diagram showing certain wave shapes produced by the pipe unit of FIG. 1 during operation.

FIG. 6 illustrates the function of the circuit of FIG. 5 by way of wave forms which occur during the operation of the circuit. Referring to this figure, the wave form 96 is that of the AC supply voltage applied across the input terminals 68 and 70, the voltage being an alternating one having a first set of half cycles 98 of positive voltage alternating with a second set of half cycles 100 of negative voltage. The circuit of FIG. 5 is one which operates in a half wave mode with periods of ringing current being produced in the coils of the pipe unit only in response to each of the positive half cycles 98. The wave form 102 represents the open and closed durations of the switch (Q1), and from this it will be noted that during each positive half cycle 98 of the supply voltage the switch (Q1) is closed during an initial portion of the half cycle and is opened at a time well in advance of the end of that half cycle (with the exact timing of this occurrence being adjustable by the adjustable resistor R4).

The opening and closing of the switch (Q1) produces the current wave form indicated at 104 in FIG. 6 which for each positive half cycle of the supply voltage is such that the current through the coils increases from zero during the initial portion of the half cycle, during which the switch (Q1) is closed, and then upon the opening of the switch (Q1) the current rings for a given period of time. The voltage appearing across the coils of the pipe unit is such as shown by the wave form 106 of FIG. 6, with the voltage upon the opening of the switch (Q1) taking on a ringing shape having a maximum voltage many times greater than the voltage provided by the power supply 14.

The frequency of the ringing currents produced in the coils and of the ringing voltages produced across the coils can be varied by varying the capacitance ($C_c$ and/or $C_t$) appearing across the switch (Q1) and is preferably set to be a frequency within the range of 10 kHz to 80 kHz.

Figure 10:
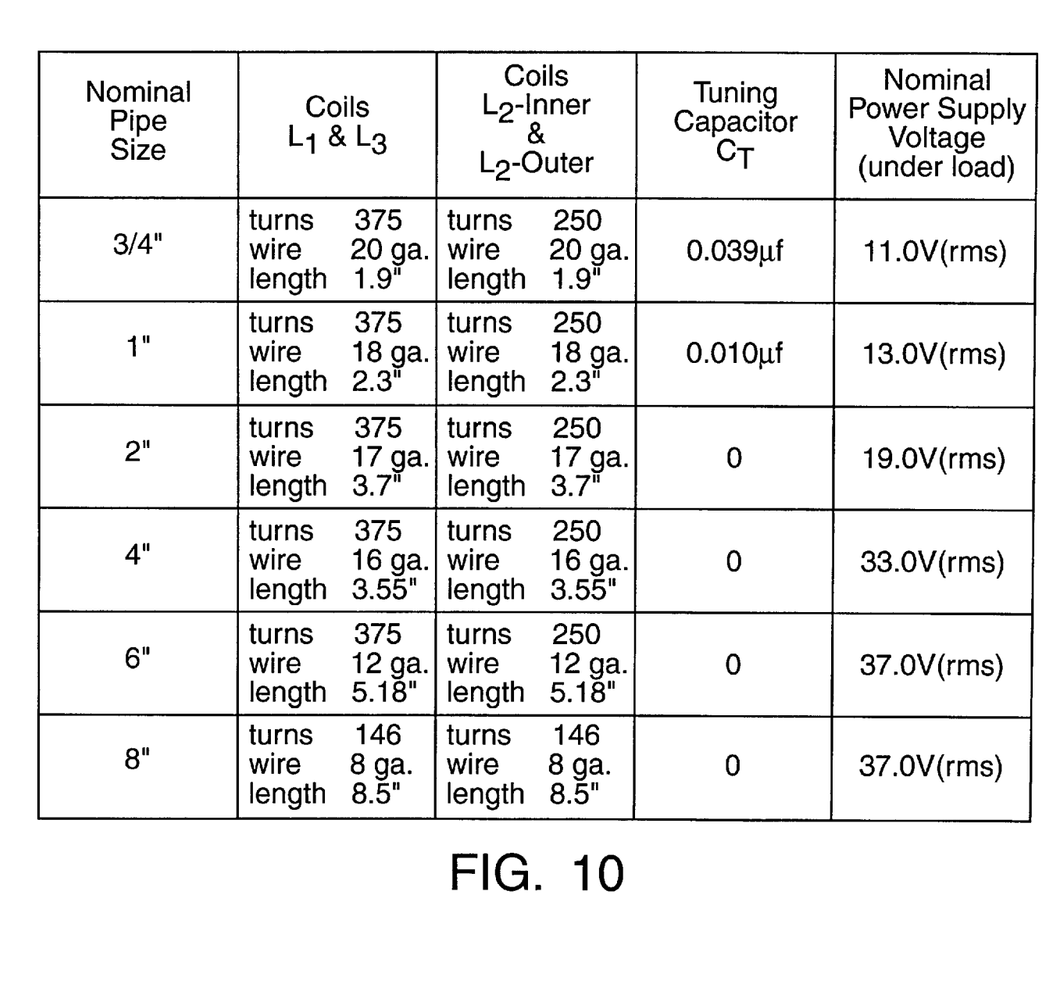
FIG. 10 A chart specifying presently preferred values of certain parameters of the apparatus of FIGS. 1 to 6.

Parameters of the apparatus of FIGS. 1–6, including nominal pipe size, arrangement of coils in terms of number of turns, gage and length, tuning capacitor capacitance and associated nominal power supply voltage are given in the form of a chart in FIG. 10.

Figure 7:
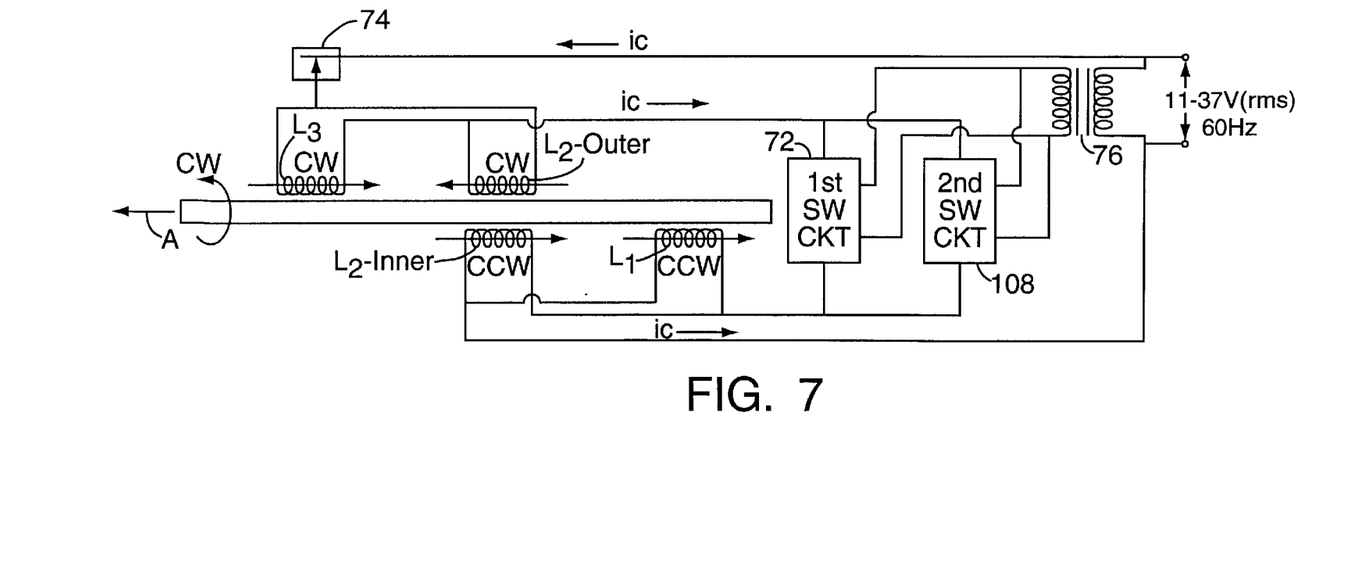
FIG. 7 A circuit diagram similar to FIG. 4 but showing a modified embodiment of the invention.

As mentioned above, the switching circuit illustrated and described in connection with FIGS. 4, 5 and 6 is one which is operable to produce one period of ringing current and ringing voltage for each alternate half cycle of the applied supply voltage. However, if wanted, the switching circuit can also be designed to operate in a full wave mode wherein a period of ringing current and of ringing voltage is produced for each half cycle of the supply voltage. As shown in FIG. 7, this can be accomplished by modifying the circuit of FIG. 4 to add a second switching circuit 108 which is identical to the first switching circuit 72 except for facing currentwise and voltagewise in the opposite direction to the first circuit 72. That is, in FIG. 7 the first circuit 72 operates as described above during each positive half cycle of the applied voltage and the second circuit 108 operates in the same way during the negative half cycles of the applied voltage, and as a result, the number of periods of current and voltage ringing over a given period of time is doubled in comparison to the number of periods produced in the same period of time by the circuit of FIG. 4.

Figure 8:
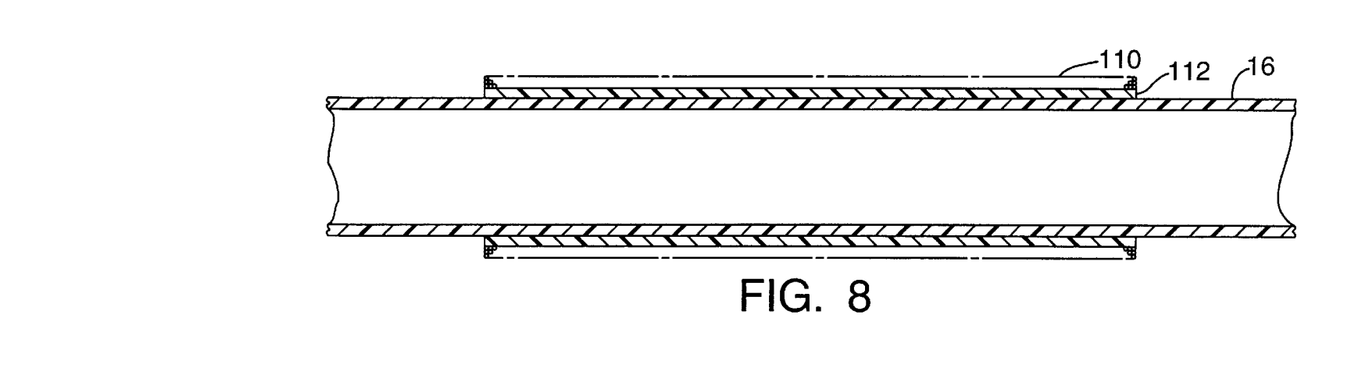
FIG. 8 A view similar to FIG. 3 but showing a modified embodiment of the invention in which the pipe unit has only one coil surrounding the liquid flow pipe.
Figure 9:
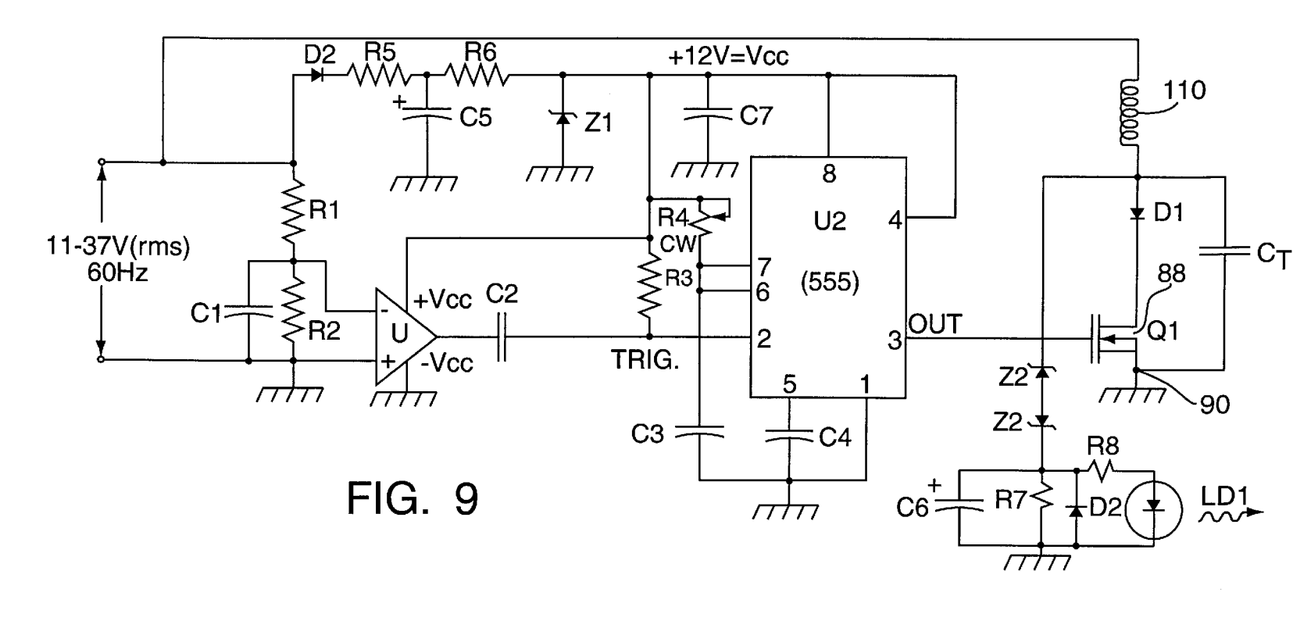
FIG. 9 A detailed circuit diagram similar to FIG. 5 but showing an electrical circuit for use with the pipe unit of FIG. 8.

Also, as mentioned above, the number of coils used in the pipe unit 12 may be varied and if wanted, the pipe unit 12 may be made with only one coil without departing from the invention. FIGS. 8 and 9 relate to such a construction with FIG. 8 showing the pipe unit to have a single coil 110 wound on a bobbin 112 and surrounding the pipe 16. The switching circuit used with the single coil pipe unit of FIG. 8 is illustrated in FIG. 9 and is generally similar to that of FIG. 5 except, that because of the single coil 110 producing no significant wiring capacitance, it is necessary to provide the tuning capacitor ($C_t$) across the first and second terminals 88 and 90 of the switch (Q1). Further, since the coil means is made up of the single coil 110 and located entirely on one side of the switch (Q1), it is unnecessary to provide the isolation transformer 76 of FIG. 5 to establish a local ground for the components of the switching circuit.

We claim:

1. An apparatus for treating flowing liquid with electromagnetic flux and to be powered by a source of alternating current electrical power wherein a set of half cycles of positive voltage alternate with a set of half cycles of negative voltage, said apparatus comprising:

a pipe for conducting a flow of liquid, at least one electrical coil surrounding said pipe, means providing a given capacitance, a first switching circuit including a triode switch having first, second, and third terminals with said first and second terminals being switchable between open and closed conditions relative to one another in response to electrical signals applied to said third terminal, and connecting means for connecting said coil, capacitance and first switching circuit to one another and to said power source such that during each half cycle of at least one of said two sets of half cycles, current due to said source power flows through said coil during an initial portion of the half cycle because of said first and second terminals of said switch being in a closed condition relative to one another and such that at a significant amount of time in advance of the completion of said half cycle, while a substantial amount of current is flowing through said triode switch, said first and second terminals of said switch are switched to their open condition, said connecting means further being such that when said first and second terminals of said switch are in their open condition relative to one another said coil and capacitance form part of a series resonant circuit so that immediately following said switching of said first and second terminals of said switch from their closed to their open condition, a ringing current appears in said coil.

2. An apparatus as defined in claim 1, wherein:

said at least one coil is one of a plurality of coils wound around said pipe, said connecting means being such that when said first and second terminals of said switch are in their closed condition current due to said source power flows through all of said coils and so that when said first and second terminals are in their open condition all of said coils are in said resonant circuit.

3. An apparatus as defined in claim 2, wherein:

at least two of said coils are wound in close association with one another on the same longitudinal portion of said pipe so as to create a winding capacitance forming at least a part of said given capacitance.

4. An apparatus as defined in claim 3, wherein:

said given capacitance is made up entirely of said winding capacitance.

5. An apparatus as defined in claim 3, wherein:

said given capacitance is made up in part of said winding capacitance and in part by a tuning capacitor connected across said first and second terminals of said switch to give said resonant circuit a desired resonant frequency.

6. An apparatus as defined in claim 1 further characterized by:

a control circuit responsive to the voltage of said power source for supplying electrical signals to said third terminal of said switch for controlling the switching of said first and second terminals between their open and closed conditions.

7. An apparatus as defined in claim 6, wherein:

said control circuit includes a comparator circuit and a timer circuit, said comparator circuit providing a trigger signal to said timer circuit when the voltage of said source passes zero at the start of each of said half cycles of said one set of half cycles, said timer circuit being responsive to said trigger signal to apply to said third terminal of said switch a first voltage signal setting said first and second terminals of said switch to their closed condition immediately upon the appearance of said trigger signal and to retain said first voltage signal at said third terminal until the running of a given delay period, and said timer circuit immediately upon the running of said delay period providing a second voltage signal to said third terminal setting said first and second terminals of said switch to their open condition.

8. An apparatus as defined in claim 7, further characterized by:

a means for adjusting said delay period of said timer circuit.

9. An apparatus as defined in claim 8, further characterized by:

an indicator circuit connected across said given capacitance for providing a visual indication when a peak voltage across said given capacitance exceeds a given value.

10. An apparatus as defined in claim 9, wherein:

the voltage of the power provided by said power source is within the range of 11 V(rms) to 37 V(rms).

11. An apparatus as defined in claim 10, wherein:

said peak voltage appearing across said given capacitance which is indicated by said indicating circuit is one which exceeds approximately 150 V.

12. An apparatus as defined in claim 2, wherein:

at least some of said coils are wound around individually associated longitudinal sections of said pipe.

13. An apparatus as defined in claim 12, wherein:

said connecting means is arranged such that when current flows through all of said coils as a result of said first and second terminals of said switch being in their closed condition, the path of the electromagnetic flux passing through the longitudinal center of at least one of said coils is directed oppositely to the direction of the electromagnetic flux passing through the center of at least one other of said coils.

14. An apparatus as defined in claim 1, wherein:

said pipe is made of an electrically non-conducting material.

15. An apparatus as defined in claim 1, wherein:

the resonant frequency of said series resonant circuit is a frequency within the range of 10 kHz to 80 kHz.

16. An apparatus as defined in claim 1, wherein:

said means providing a given capacitance includes a tuning capacitor connected across said first and second terminals of said switch to give said resonant circuit a desired resonant frequency.

17. An apparatus as defined in claim 1, wherein:

said triode switch is a MOSFET.

18. An apparatus as defined in claim 1, wherein:

said connecting means includes an isolation transformer connected between said power source and the sub-circuit made up of said coil, capacitance and switching circuit.

19. An apparatus as defined in claim 1, wherein:

said at least one electrical coil surrounding said pipe is the only electrical coil surrounding said pipe.

20. An apparatus as defined in claim 1, further characterized by:

a second switching circuit including a second triode switch having first, second and third terminals with said first and second terminals being switchable between open and closed conditions relative to one another in response to an electrical signal applied to said third terminal, and said connecting means being one for connecting said coil, capacitance, and first and second switching circuits to one another and to said power source and further being such that during each half cycle of said other one of said two sets of half cycles, current due to said source power flows through said coil and said second switch during an initial portion of the half cycle because of said first and second terminals of said second switch being in a closed condition relative to one another and such that at a significant amount of time in advance of the completion of said half cycle said first and second terminals of said second switch are switched to their open condition, said connecting means further being such that when said first and second terminals of said second switch are in their open condition relative to one another said coil and capacitance form part of a series resonant circuit with the result that when said first and second terminals of said second switch are switched from their closed to their open condition, a ringing current appears in said coil.

21. An apparatus for treating flowing liquid with electromagnetic flux and to be powered by a source of alternating current electrical power wherein a set of half cycles of positive voltage alternate with a set of half cycles of negative voltage, said apparatus comprising:

a pipe for conducting a flow of liquid, a plurality of electrical coils surrounding said pipe, means providing a given capacitance, a switch having first and second terminals having open and closed conditions relative to one another, connecting means for connecting said coils, given capacitance and switch to one another and to said power source such that during each half cycle of at least one of said two sets of half cycles, current due to said source power flows through said coils during at least a portion of said half cycle because of said first and second terminals of said switch being in said closed condition relative to one another, said connecting means further being such that when said first and second terminals of said switch are in said open condition relative to one another said coils and said given capacitance form part of a series resonant circuit, and said connecting means further being such that when said first and second terminals of said switch are in their closed condition so that electrical current due to said source power flows through said coils the electromagnetic flux passing through the center of at least one of said coils flows in a first direction parallel to said pipe and so that the electromagnetic flux passing through the center of at least one other of said coils flows in a second direction parallel to said pipe opposite to said first direction.

22. An apparatus as defined in claim 21, wherein:

said switch is a triode switch.

* * * * *